(12) United States Patent
Komai et al.

(10) Patent No.: US 6,224,980 B1
(45) Date of Patent: May 1, 2001

(54) FINE POWDER OF HYDROPHOBIC TITANIUM OXIDE, AND METHOD FOR PRODUCING IT

(75) Inventors: Eiji Komai; Masamichi Murota; Hirokuni Shirono, all of Mie-ken (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 09/282,173

(22) Filed: Mar. 31, 1999

(30) Foreign Application Priority Data

Mar. 31, 1998 (JP) .................................................. 10-086105

(51) Int. Cl.⁷ ....................................................... B32B 5/16
(52) U.S. Cl. .......................... 428/403; 106/446; 427/219; 428/407
(58) Field of Search .................................... 428/402, 407, 428/403; 106/446; 501/134; 427/219

(56) References Cited

U.S. PATENT DOCUMENTS

| | | | |
|---|---|---|---|
| 3,839,063 | * 10/1974 | Beliveau | 106/300 |
| 5,411,761 | * 5/1995 | Inokuchi et al. | 427/220 |
| 5,635,326 | * 6/1997 | Kanbayashi et al. | 430/110 |
| 5,747,211 | * 5/1998 | Hagi et al. | 430/110 |
| 5,827,632 | * 10/1998 | Inaba et al. | 430/110 |
| 5,849,451 | * 12/1998 | Ishihara et al. | 430/110 |
| 5,922,500 | * 7/1999 | Iida et al. | 430/110 |
| 6,001,326 | * 12/1999 | Kim et al. | 423/598 |
| 6,004,711 | * 12/1999 | Bourne et al. | 430/160.6 |
| 6,007,957 | * 12/1999 | Kobori et al. | 430/106.6 |
| 6,077,640 | * 6/2000 | Komai et al. | 430/110 |

* cited by examiner

Primary Examiner—Hoa T. Le
(74) Attorney, Agent, or Firm—Oblon, Spivak, McClelland, Maier & Neustadt, P.C.

(57) ABSTRACT

A fine powder of hydrophobic titanium oxide, which, when added to toner powder, gives it high flowability and good electrification stability. The titanium oxide is prepared by hydrolyzing a volatile titanium compound while in a high-temperature vapor-phase condition, in the presence of a combustible or incombustible gas, and has a BET specific surface area of from 55 to 150 $m^2/g$ and an anatase/rutile crystal structure with a ratio of anatase falling between 0.3 and 0.98. It is processed for surface modification with a silane coupling agent and/or a silicone compound to produce a fine powder of hydrophobic titanium oxide.

5 Claims, No Drawings

FINE POWDER OF HYDROPHOBIC TITANIUM OXIDE, AND METHOD FOR PRODUCING IT

BACKGROUND OF THE INVENTION

1. Field of the Invention

The present invention relates to fine powder of hydrophobic titanium oxide and to a method for producing it. In particular, it relates to fine powder of hydrophobic titanium oxide which is added as an additional agent to powder coating compositions, toners for electrophotography and other compositions for the purpose of, for example, improving their powdery flowability, preventing them from becoming caked, and controlling the electrification thereof.

2. Description of the Related Art

Many patents have heretofore been issued relating to fine powders of hydrophobic titanium oxide that are used, for example, as additional agents in toners for electrostatic development.

JP-A 5-72797 discloses ultra-fine grains of amorphous and hydrophobic titanium oxide that are produced through vapor-phase pyrolysis or hydrolysis of a volatile titanium compound to give fine grains of amorphous titanium oxide followed by treatment of the grains with an organosilane compound.

JP-A 60-136755 describes a technique of adding both hydrophobic titanium oxide and hydrophobic silica to a negatively charged toner. The hydrophobic titanium oxide used therein is prepared from titanium oxide having a mean grain size of 30 nm and a BET specific surface area of 50 $m^2/g$.

JP-A 8-220791, 8-220795 and 8-220796, disclose a technique of using, as an additional agent for toners, hydrophobic titanium oxide as prepared in a wet method and processed in an aqueous system for hydrophobication.

However, among these conventional fine powders of hydrophobic titanium oxide, the ultra-fine grains of hydrophobic amorphous titanium oxide described in JP-A 5-72797 contain a large amount of water which is adsorbed inside the grains and is therefore problematic because their electrification properties often fluctuate depending on changes in the surroundings including temperature and humidity, and they exhibit a weak electrification.

The hydrophobic titanium oxide described in JP-A 60-1367 55, which is prepared from titanium oxide having a mean grain size of 30 nm and a BET specific surface area of 50 $m^2/g$, is problematic in that, when it is added to toners by itself, it does not ensure good flowability of toners containing it.

The fine powder of hydrophobic titanium oxide described in JP-A 8-220791, which is prepared in a wet method and is processed in an aqueous system for hydrophobication, is problematic in that it requires a drying step, and that an additional step of pulverizing the aggregates of the powder having a large bulk density is indispensable. In addition, the fine titanium oxide powder produced according to the disclosed method contains a large amount of water adsorbed thereto. Therefore, like that in JP-A 60-136755, the powder is still problematic in that its electrification property often fluctuates depending on changes in the surroundings including temperature and humidity.

Moreover, an additional problem with all of these conventional fine powders of hydrophobic titanium oxide is that they are expensive to produce.

As mentioned above, the conventional fine powders of hydrophobic titanium oxide all face, in no small way, the above-mentioned problems in electrification properties, flowability, and production costs.

On the other hand, a recent tendency in the field of electrophotography is toward producing images of much higher quality, for which the grains to be used are much smaller. The same applies to various powder coating materials. Under these circumstances, the necessity of enhancing the flowability of various powders, such as toners and others, is increasing greatly.

SUMMARY OF THE INVENTION

An object of the invention is to provide relatively inexpensive, fine powder of hydrophobic titanium oxide which is excellent in its flowability improving effect and electrification-stabilizing effect, and also to provide a method for producing it.

The fine powder of hydrophobic titanium oxide of the present invention is obtained through surface modification of titanium oxide with a silane coupling agent and/or a silicone compound, and the titanium oxide is prepared by hydrolyzing a volatile titanium compound while in a high-temperature vapor-phase condition, in the presence of a combustible or incombustible gas. It has a BET specific surface area of from 55 to 150 $m^2/g$ while having an anatase/rutile crystal structure in a ratio of anatase falling between 0.3 and 0.98.

The fine powder of hydrophobic titanium oxide of the invention is obtained through surface modification of titanium oxide having a BET specific surface area of from 55 to 150 $m^2/g$ and having an anatase/rutile crystal structure with a ratio of anatase falling between 0.3 and 0.98, using a silane coupling agent and/or a silicone compound. The product has an extremely high degree of hydrophobicity, and, therefore, its electrification property fluctuates little. Accordingly, when the fine powder of hydrophobic titanium oxide of the invention is used in toners for electrophotography, it ensures good electrification stability and high flowability for a long period of time. In addition, the fine powder of hydrophobic titanium oxide of the invention is produced by a relatively simple method comprising only a few steps, without causing any problems of environmental pollution, and the production costs for it are low.

The preferred silane coupling agent to be used is represented by the following general formulas (I) or (II). The preferred silicone compound is represented by formula (III);

wherein X represents a hydroxyl group, an alkoxy group or a halogen atom; R represents an alkyl group having from 1 to 18 carbon atoms; and n represents an integer of from 0 to 3;

wherein each R' represents an alkyl group having from 1 to 3 carbon atoms, optionally substituted with any other substituent including hydrogen atoms, vinyl groups and others;

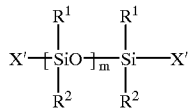

(III)

wherein $R^1$ represents a methyl group or an ethyl group; $R^2$ represents a hydrogen atom, a methyl group, an ethyl group, or an alkyl group optionally substituted by a vinyl group, a phenyl group or an amino group; X' represents a hydroxyl group, an alkoxy group, a halogen atom or an alkyl group; and m represents an integer of from 1 to 500.

Desirably, the fine powder of hydrophobic titanium oxide of the invention has a degree of hydrophobicity of at least 70% as measured according to a transmittance method.

The fine powder of hydrophobic titanium oxide of the invention can be readily produced by hydrolyzing a volatile titanium compound while it is in a high-temperature vapor-phase condition, in the presence of a combustible or incombustible gas to prepare titanium oxide having a BET specific surface area of from 55 to 150 m$^2$/g and having an anatase/rutile crystal structure with a ratio of anatase falling between 0.3 and 0.98, followed by mixing the resulting titanium oxide with from 0.1 to 50% by weight, relative to the titanium oxide, of a silane coupling agent and/or from 0.1 to 50% by weight, relative to the same, of a silicone compound and heating the resulting mixture.

DESCRIPTION OF THE PREFERRED EMBODIMENTS

In the invention, titanium oxide which is prepared by hydrolyzing a volatile titanium compound, such as TiCl$_4$, in the presence of a combustible or incombustible gas while the compound is in a high-temperature vapor-phase condition, and which has a BET specific surface area of from 55 to 150 m$^2$/g and has an anatase/rutile crystal structure with a ratio of anatase (hereinafter referred to as the "anatase ratio") falling between 0.3 and 0.98, is processed with a silane coupling agent and/or a silicone compound for surface modification.

Many commercially-available products of so-called wet titanium oxide, which are produced according to a sulfuric acid method or the like, have surface area sites to increase their specific surface area even inside the titanium oxide grains. Therefore, their drying loss is large and their electrification property is poor. In addition, they have a large bulk density. As opposed to those, grains of so-called dry titanium oxide have a relatively small inside specific surface area, and, therefore, have small drying loss, relatively strong electrification properties and small bulk density.

The volatile titanium compound to be used herein as the starting material includes, for example, TiCl$_4$ and titanium alkoxides such as Ti(OCH$_3$)$_4$, Ti(OC$_2$H$_5$)$_4$, etc.

When titanium oxide as prepared by decomposing such volatile titanium compounds has a BET specific surface area of smaller than 55 m$^2$/g, it is difficult to disperse uniformly. Therefore, when added to toners, the flowability of the toners becomes poor. On the other hand, titanium oxide having a BET specific surface area of larger than 150 m$^2$/g aggregates to a great extent, and therefore it also worsens the flowability of toners.

Titanium oxide having an anatase ratio of smaller than 0.3 is unfavorable, since its surface activity is too weak to significantly modify the surface. Even though modified at its surface, a titanium oxide of that type would not have good hydrophobicity. On the other hand, titanium oxide having an anatase ratio of larger than 0.98 is also unfavorable, since its surface activity is too strong; when subjected to surface modification, the surface modifier is partly decomposed and cannot uniformly modify the surface of the compound. The anatase ratio as referred to herein is obtained according to the method to be described later in the Examples section.

Titanium oxide having a BET specific surface area of from 55 to 150 m$^2$/g and having an anatase ratio of from 0.3 to 0.98 can be prepared, for example, by thermally hydrolyzing a volatile titanium compound in the presence of a combustible gas such as oxyhydrogen gas, methane, ethane or the like or in an incombustible gas such as argon, helium, nitrogen or the like, under the condition that the titanium concentration in the raw gases falls between 5 and 250 g/m$^3$ in terms of titanium dioxide, at a temperature falling between 600 and 1800° C.

In the invention, the surface modifier to be used for the titanium oxide thus prepared in the manner mentioned above is preferably a silane coupling agent represented by formula (I) or (II) mentioned above and/or a silicone compound represented by formula (III) mentioned above. However, long-chain alkyl silane coupling agents of formulas (I) and (II), where R is an alkyl group having more than 18 carbon atoms, are unfavorable since they cause stearic hindrance and therefore do not uniformly modify the surfaces of the titanium oxide grains. In addition, grains processed with them often aggregate.

In formula (I), a silane coupling agent for use in the invention, R is preferably an alkyl group having from 1 to 10 carbon atoms, and X is preferably a hydroxyl group, an alkoxy group having from 1 to 3 carbon atoms, or a halogen atom such as Cl or the like. Concretely, the silane coupling agent of formula (I) includes methyltrimethoxysilane, dimethyltrimethoxysilane, dimethyltriethoxysilane, n-butyltrimethoxysilane, isobutyltrimethoxysilane, n-hexyltrimethoxysilane, n-octyltrimethoxysilane, decyltrimethoxysilane, dimethyldichlorosilane, methyltrichlorosilane, etc.

In formula (II), another silane coupling agent for use in the invention, R' is preferably an alkyl group having from 1 to 3 carbon atoms. Concretely, the silane coupling agent includes hexamethyldisilazane, etc. One example of the silane coupling agent of formula (II) where some R's are substituted with hydrogen atoms is tetramethyldisilazane, and one where some R's are substituted with vinyl groups is divinyltetramethyldisilazane.

Low-molecular silicone compounds of formula (III) are often ineffective in hydrophobicating titanium oxide grains. High-molecular silicone compounds of formula (III) may be effective in hydrophobicating titanium oxide grains, but the grains processed with them will often aggregate.

In formula (III) representing the silicone compound for use in the invention, $R^2$ is preferably a hydrogen atom, a methyl group, ethyl group, propyl group or the like, X' is preferably a hydroxyl group, a methoxy group, a methyl group, ethyl group, propyl group or the like, and m is preferably from 1 to 500, more preferably from 15 to 300. As the silicone compound, preferred are dimethylpolysiloxanes, methylhydrogenpolysiloxanes, α,ω-hydroxyorganopolysiloxanes, alkyl-modified silicone oils and others having a molecular weight of from about 1000 to 20000.

The surface modifiers mentioned above may be used either singly or as combined. If desired, two or more such surface modifiers may be stepwise applied to titanium oxide in plural stages.

The surface modification may be effected by either a wet method or a dry method. In view of the problem of aggregation of the processed grains, however, dry surface modification is preferred. Further in view of the processing costs, the treatment of wastes and the influence on the environment, dry surface modification is preferred.

In the dry surface modification, for example, the silane coupling agent and/or a silicone compound modifier is applied dropwise to the fine titanium oxide powder in an inert gas atmosphere while stirring the powder and the dry surface modification treatment is kept under heating at a temperature falling between 50 and 400° C. for from 0.1 to 3 hours or so with stirring.

In the surface modification, if the amount of the silane coupling agent and/or the silicone compound used is too small, the intended surface modification cannot be satisfactorily attained. On the other hand, if the amount is too large, many aggregates will be formed. Therefore, the amount of the silane coupling agent and/or the silicone compound to be used is preferably from 0.1 to 50% by weight, more preferably from 1 to 30% by weight relative to titanium oxide to be processed therewith.

The fine powder of hydrophobic titanium oxide of the invention thus obtained in the manner mentioned above preferably has a degree of hydrophobicity of at least 70%, more preferably at least 80% as measured according to a transmittance method. This is favorably used as an additional agent for powdery coating compositions, toners for electrophotography, etc. In its use, the fine powder of hydrophobic titanium oxide of the invention is not limited to single use only, but may be combined with any other fine powders of metal oxides. For example, the fine powder of hydrophobic titanium oxide of the invention may be combined with surf ace-modified fine powder of dry-process silica, surface-modified fine powder of wet process titanium oxide, etc.

The toners to which the fine powder of hydrophobic titanium oxide of the invention are applied include one-component magnetic toners, one-component non-magnetic toners, two component toners, etc. The fine powder of hydrophobic titanium oxide of the invention is applicable to negatively charged toners and positively charged toners. The system to which it is applied include monochromatic and color imaging systems.

The invention is described in more detail with reference to the following Examples and Comparative Examples, which, however, are not intended to restrict the scope of the invention.

In the following Examples and Comparative Examples, the anatase ratio, amount of electrification and degree of hydrophobicity of fine powder of hydrophobic titanium oxide; the angle of repose and 45 μm-screen passing-through percentage of toner compositions (both indicating the flowability of the toner); and the amount of electrification change (which indicates the amount of electrification stability of the compositions to ambient surrounding conditions), were measured according to the methods described below.

(1) Anatase Ratio:

A sample of fine, hydrophobic titanium oxide powder to be measured was pressed against a sample holder with a glass plate and flattened therebetween, and this was analyzed with an X-ray diffractometer (from Phillips). In the resulting diffraction pattern that gave a diffraction peak ($I_R$) at (101) for the strongest interference line of the anatase-type crystal structure and a diffraction peak ($I_R$) at (110) for the strongest interference line of the rutile-type crystal structure, the anatase-type crystal structure content (A) was obtained according to the following equation. The value obtained indicates the anatase ratio of the sample.

$$A(\%)=100/(1+1.265 \times I_A/I_R)$$

(Reference: R. A. Spurr, H. Myers, Anal. Chem., 29, 760 (1957)

(2) Amount of Electrification:

50 g of iron powder carrier and 0.1 g of a sample of fine, hydrophobic titanium oxide powder to be measured were put into a 75-ml glass container, covered with a cap, and shaken for 5 minutes by the use of a tumbler mixer. 0.1 g of the iron powder carrier mixed with the fine, hydrophobic titanium oxide powder sample was taken out, and subjected to nitrogen blowing for 1 minute by the use of a blow-off static electrometer (TB-200 Model from Toshiba Chemical). The value of static electricity thus measured indicates an amount of electrification of the sample.

(3) Degree of Hydrophobicity:

One gram of a sample of fine, hydrophobic titanium oxide powder was put into a 200-ml separating funnel, to which was added 100 ml of pure water. After being sealed with a stopper, it was shaken for 10 minutes by the use of a tumbler mixer, and then left static for 10 minutes. 20 to 30 ml of the lower layer of the mixture was taken out of the funnel, and transferred into a plurality of 10-mm quartz cells. Each cell was subjected to colorimetry, using a pure water cell as the blank and the transmittance therethrough at 500 nm was measured. This indicates the degree of hydrophobicity of the sample.

(4) Angle of Repose:

0.4 g of a sample of fine, hydrophobic titanium oxide powder to be measured was mixed in a mixer with 40 g of an 8 μm toner having a negative-charging property, and the resulting toner composition was subjected to a powder test using a powder tester of PT-N Model (from Hosokawa Micron), in which the angle of repose of the sample was measured. Samples having an angle of repose of at most 35 degrees thus measured have good flowability.

(5) 45 μm-Screen Passing-Through Percentage:

0.4 g of a sample of fine, hydrophobic titanium oxide powder to be measured was mixed in a mixer with 40 g of an 8 μm toner having a negative-charging property, and the resulting toner composition was subjected to a powder test using a powder tester of PT-N Model (from Hosokawa Micron), in which the composition was sieved through 150 μm, 75 μm and 45 μm screens in order while the screens were vibrated, and the proportion of the sample having passed through all those 150 μm, 75 μm and 45 μm screens was obtained. This indicates the 45 μm-screen passing-through percentage of the sample. Samples having a value of at least 85% thus measured is have good flowability.

(6) Amount of Electrification Change:

2 g of a toner composition that had been prepared by mixing in a mixer 0.4 g of a sample of fine, hydrophobic titanium oxide powder to be measured and 40 g of an 8 μm toner having a negative-charging property, and 48 g of iron powder carrier were put into a 75-ml glass container. Two other mixtures were prepared in the same manner. These were separately left in HH and LL conditions for 24 hours. The HH condition represents an atmosphere having a temperature of 40° C. and a humidity of 85%; and the LL condition represents an atmosphere having a temperature of 10° C. and a humidity of 20%. Those mixtures of the toner composition and the iron powder carrier thus having been left for 24 hours in the HH and LL atmospheres were separately shaken for 5 minutes by the use of a tumbler mixer. 0.2 g of each of the thus-shaken mixtures composed of the toner composition and the iron carrier was taken out, and subjected to nitrogen blowing for 1 minute by the use of a blow-off static electrometer (TB-200 Model from Toshiba Chemical). The value of static electricity thus measured indicates each amount of electrification of the toner composition in two different conditions. The difference in the amount of electrification between the mixture left in the HH circumstance for 24 hours and that left in the LL circumstance also for 24 hours is obtained. Samples of which the difference value is at most 5 μC/g have good stability, without being influenced by the ambient surroundings.

EXAMPLE 1

100 parts by weight of fine titanium oxide powder (prepared by thermally hydrolyzing titanium tetrachloride in a gas phase in the presence of oxyhydrogen gas under the condition that the titanium concentration in the raw gases was 80 g/m$^2$ in terms of titanium dioxide, at a temperature of 1000° C., and had a BET specific surface area of 90 m$^2$/g and an anatase ratio of 0.85) was put into a mixer, to which was dropwise added 20 parts by weight of n-octyltrimethoxysilane, with stirring in a nitrogen atmosphere, then heated for 2 hours with still stirring at 150° C., and thereafter cooled.

The thus-obtained, fine powder of hydrophobic titanium oxide was evaluated, and its data are shown in Table 1.

As in Table 1, the toner composition comprising the fine, hydrophobic titanium oxide powder had good flowability, and its stability of amount of electrification in varying surroundings was very good.

COMPARATIVE EXAMPLE 1

100 parts by weight of fine titanium oxide powder (this was prepared in the same manner as in Example 1, except that the reaction temperature was 800° C. and that the titanium concentration in the raw gases was 300 g/m$^2$ in terms of titanium dioxide, and had a BET specific surface area of 50 m$^2$/g and an anatase ratio of 0.80) was put into a mixer, to which was dropwise added 12 parts by weight of n-octyltrimethoxysilane, with stirring in a nitrogen atmosphere, then heated for 2 hours with still stirring at 150° C., and thereafter cooled.

The thus-obtained, fine powder of hydrophobic titanium oxide was evaluated, and its data are shown in Table 1.

The fine, hydrophobic titanium oxide powder was much aggregated and could not disperse around toner grains having a negative-charging property. Therefore, the flowability of the toner composition containing it was poor. In addition, the stability of the amount of electrification of the composition in varying surroundings was also poor.

EXAMPLE 2

100 parts by weight of fine titanium oxide powder (prepared in the same manner as in Example 1, except that the reaction temperature was 900° C. and that the titanium concentration in the raw gases was 40 g/m$^2$ in terms of titanium dioxide, and had a BET specific surface area of 120 m$^2$/g and an anatase ratio of 0.90) was put into a mixer, to which was dropwise added 20 parts by weight of n-butyltrimethoxysilane, with stirring in a nitrogen atmosphere, then heated for 2 hours with still stirring at 150° C., and thereafter cooled.

The thus-obtained, fine powder of hydrophobic titanium oxide was evaluated, and its data are shown in Table 1.

As in Table 1, the toner composition comprising the fine, hydrophobic titanium oxide powder had good flowability, and its stability of amount of electrification in varying surroundings was very good.

COMPARATIVE EXAMPLE 2

100 parts by weight of a commercially-available, anatase-type hydrophilic titanium oxide as prepared in a wet process (having a BET specific surface area of 120 m$^2$/g and an anatase ratio of 1.0) was added to an aqueous medium comprising water, and well stirred, to which was added 20 parts by weight of n-butyltrimethoxysilane, and stirred. The resulting mixture was filtered, and the residue was dried and ground to obtain fine powder of hydrophobic titanium oxide.

The fine powder of hydrophobic titanium oxide thus obtained was evaluated, and its data are shown in Table 1.

The flowability and the stability of amount of electrification in varying surroundings of the toner composition comprising the fine, hydrophobic titanium oxide powder obtained herein were both poor.

EXAMPLE 3

100 parts by weight of fine titanium oxide powder (prepared in the same manner as in Example 1, except that the reaction temperature was 1500° C. and that the titanium concentration in the raw gases was 230 g/m$^3$ in terms of titanium dioxide, and had a BET specific surface area of 55 m$^2$/g and an anatase ratio of 0.30) was put into a mixer, to which was dropwise added 30 parts by weight of n-octadecyltrimethoxysilane, with stirring in a nitrogen atmosphere, then heated for 2 hours with still stirring at 150° C., and thereafter cooled.

The thus-obtained, fine powder of hydrophobic titanium oxide was evaluated, and its data are shown in Table 1.

As in Table 1, the toner composition comprising the fine, hydrophobic titanium oxide powder had good flowability, and its stability of amount of electrification in varying surroundings was very good.

COMPARATIVE EXAMPLE 3

100 parts by weight of fine titanium oxide powder (prepared in the same manner as in Example 1, except that the reaction temperature was 2000° C. and that the titanium concentration in the raw gases was 230 g/m$^3$ in terms of titanium dioxide, and had a BET specific surface area of 55 m$^2$/g and an anatase ratio of 0.10) was put into a mixer, to which was dropwise added 30 parts by weight of n-octadecyltrimethoxysilane, with stirring in a nitrogen atmosphere, then heated for 2 hours with still stirring at 150° C., and thereafter cooled.

The thus-obtained, fine powder of hydrophobic titanium oxide was evaluated, and its data are shown in Table 1.

As compared with that in Example 3, the flowability of the toner composition comprising the fine, hydrophobic titanium oxide powder obtained herein was poor. In addition, the change of amount of electrification in the composition in varying surroundings was great. This is because the starting titanium oxide had such a small anatase ratio and its reactivity was low. As a result, the starting compound could not well react with n-octadecyltrimethoxysilane applied thereto. Therefore, the fine titanium oxide powder obtained after the treatment for surface modification had a low degree of hydrophobicity and its drying loss was large.

EXAMPLE 4

100 parts by weight of fine titanium oxide powder (prepared in the same manner as in Example 1, except that the reaction temperature was 1500° C. and that the titanium concentration in the raw gases was 15 g/m$^3$ in terms of titanium dioxide, and had a BET specific surface area of 150 m$^2$/g and an anatase ratio of 0.95) was put into a mixer, to which was dropwise added 25 parts by weight of methylhydrogenpolysiloxane, with stirring in a nitrogen atmosphere, then heated for 1 hour with still stirring at 250° C., and thereafter cooled.

The thus-obtained, fine powder of hydrophobic titanium oxide was evaluated, and its data are shown in Table 1.

As in Table 1, the toner composition comprising the fine, hydrophobic titanium oxide powder had good flowability, and its stability of amount of electrification in varying surroundings was very good.

COMPARATIVE EXAMPLE 4

100 parts by weight of fine titanium oxide powder (prepared in the same manner as in Example 1, except that the reaction temperature was 1500° C. and that the titanium concentration in the raw gases was 3 g/m$^3$ in terms of titanium dioxide, and had a BET specific surface area of 200 m$^2$/g and an anatase ratio of 0.96) was put into a mixer, to which was dropwise added 30 parts by weight of methylhydrogenpolysiloxane, with stirring in a nitrogen atmosphere, then heated for 1 hour with still stirring at 250° C., and thereafter cooled.

The thus-obtained, fine powder of hydrophobic titanium oxide was evaluated, and its data are shown in Table 1.

The fine, hydrophobic titanium oxide powder aggregated to an extremely great extent as the starting titanium oxide had a large specific surface area. Therefore, when mixed with a toner it could not disperse well around the toner grains. As a result, the toner composition comprising the powder did not have good flowability. In addition, the change of amount of electrification in the composition in varying surroundings was great.

EXAMPLE 5

100 parts by weight of fine titanium oxide powder (prepared in the same manner as in Example 1. except that the reaction temperature was 1100° C. and that the titanium concentration in the raw gases was 100 g/m$^3$ in terms of titanium dioxide, and had a BET specific surface area of 100 m$^2$/g and an anatase ratio of 0.80) was put into a mixer, to which was dropwise added 10 parts by weight of hexamethyldisilazane, with stirring in a nitrogen atmosphere, then heated for 2 hours with still stirring at 200° C., and thereafter cooled. To 100 parts by weight of the fine powder of hydrophobic titanium oxide thus obtained, dropwise added was a mixture of 10 parts by weight of dimethylpolysiloxane and 30 parts by weight of n-hexane, with stirring in a nitrogen atmosphere, then heated for 1 hour with still stirring at 300° C., and thereafter cooled.

The thus-obtained, fine powder of hydrophobic titanium oxide was evaluated, and its data are shown in Table 1.

As in Table 1, the toner composition comprising the fine, hydrophobic titanium oxide powder had good flowability, and its stability of amount of electrification in varying surroundings was very good.

COMPARATIVE EXAMPLE 5

100 parts by weight of amorphous hydrophilic titanium oxide (having a BET specific surface area of 100 m$^2$/g) was put into a mixer, to which was dropwise added 10 parts by weight of hexamethyldisilazane, with stirring in a nitrogen atmosphere, then heated for 2 hours with still stirring at 200° C., and thereafter cooled. To 100 parts by weight of the fine powder of hydrophobic titanium oxide thus obtained, dropwise added was a mixture of 10 parts by weight of dimethylpolysiloxane and 30 parts by weight of n-hexane, with stirring in a nitrogen atmosphere, then heated for 1 hour with still stirring at 300° C., and thereafter cooled.

The thus-obtained, fine powder of hydrophobic titanium oxide was evaluated, and its data are shown in Table 1.

The toner composition comprising the fine, hydrophobic titanium oxide powder obtained herein did not have good flowability. In addition, since the powder contained much water adsorbed inside the grains, the change of amount of electrification in the toner composition containing it was great, depending on the ambient surroundings including temperature and humidity.

$$R'_3SiNHSiR'_3 \quad (II)$$

where each R' represents an alkyl group having 1 to 3 carbon atoms, which are optionally substituted with hydrogen atoms, vinyl groups or any other substituent.

TABLE 1

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Fine Titanium Oxide Powder | | | | | | | | | | |
| BET Specific Surface Area (m²/g) | 90 | 120 | 55 | 150 | 100 | 50 | 120 | 55 | 200 | 100 |
| Anatase Ratio | 0.85 | 0.90 | 0.3 | 0.95 | 0.80 | 0.80 | 1.0 | 0.1 | 0.96 | — |
| Surface Modifier | | | | | | | | | | |
| Compound(*1) | A | B | C | D | E   F | A | B | C | D | E   F |
| Amount (wt. %)(*2) | 20 | 20 | 30 | 25 | 10   10 | 12 | 20 | 30 | 30 | 10   10 |
| Test Data of Fine Hydrophobic Titanium Oxide Powder | | | | | | | | | | |
| BET Specific Surface Area (m²g) | 65 | 95 | 30 | 110 | 65 | 30 | 98 | 33 | 140 | 70 |
| Amount of Carbon (wt. %) | 6.5 | 4.5 | 7.5 | 3.9 | 5.2 | 3.7 | 4.0 | 3.5 | 5.0 | 4.2 |
| Drying Loss (wt. %) | 0.5 | 0.6 | 0.6 | 0.5 | 0.6 | 0.4 | 1.5 | 1.2 | 0.7 | 1.8 |
| Amount of Electrification (μC/g) | −120 | −120 | −90 | −110 | −100 | −100 | −40 | −50 | −105 | −70 |
| Degree of Hydrophobicity (%) | 97 | 95 | 80 | 95 | 90 | 99 | 70 | 10 | 91 | 70 |
| Flowability | | | | | | | | | | |
| Angle of Repose | 30 | 29 | 33 | 29 | 30 | 40 | 32 | 35 | 37 | 38 |
| 45-μm Screen Passing-Through Percentage (%) | 90 | 92 | 80 | 93 | 89 | 60 | 80 | 72 | 75 | 55 |
| Stability | | | | | | | | | | |
| Change of Amount of Electrification (μC/g) | 2 | 3 | 4 | 2 | 2 | 10 | 8 | 10 | 7 | 11 |

(*1)A: N-octyltrimethoxysilane, B: N-butyltrimethoxysilane, C: N-octadecyltrimethoxysilane, D: Methylhydrogenpolysiloxane, E: Hexamethyldisilazane, F: Dimethylpolysiloxane
(*2)This is based on the fine titanium oxide powder.

As described in detail hereinabove, the invention provides a relatively inexpensive, fine powder of hydrophobic titanium oxide, which, when added to toner powder, makes the resulting toner powder have high flowability and good electrification stability, and also provides an inexpensive method for producing the fine, hydrophobic titanium oxide powder.

While the invention has been described in detail and with reference to specific embodiments thereof, it will be apparent to one skilled in the art that various changes and modifications can be made therein without departing from the spirit and scope thereof.

Japanese patent application Hei 10-86105 filed Mar. 31, 1998 is hereby incorporated by reference.

What is claimed is:

1. A toner additive comprising a fine powder of hydrophobic titanium oxide, obtained by surface modification of titanium oxide with a silane coupling agent and/or a silicone compound, said titanium oxide prepared by hydrolyzing a volatile titanium compound while in a high-temperature vapor-phase condition, in the presence of a combustible or incombustible gas, and having a BET specific surface area of from 55 to 150 m²/g while having an anatase/rutile crystal structure with a ratio of anatase falling between 0.3 and 0.98.

2. The toner additive of claim 1, wherein said silane coupling agent is represented by formula (I) or (II):

$$X_{4-n}SiR_n \quad (I)$$

where X represents hydroxyl group, an alkoxy group or a halogen atom; R represents an alkyl group having from 1 to 18 carbon atoms; and n represents an integer of from 0 to 3, 3. The toner additive of claim 1, wherein said silicone compound is represented by a general formula (III):

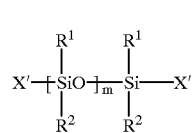

(III)

where R¹ represents a methyl group or an ethyl group; R² represents a hydrogen atom, a methyl group, an ethyl group, or an alkyl group optionally substituted by a vinyl group, a phenyl group or an amino group; X' represents a hydroxyl group, an alkoxy group, a halogen atom or an alky group; and m represents an integer of from 1 to 500.

4. The toner additive of claim 1, which has a degree of hydrophobicity of at least 70% as measured according to a transmittance method.

5. A method for producing a fine powder of hydrophobic titanium oxide, comprising:

hydrolyzing a volatile titanium compound while in a high-temperature vapor-phase condition, in the presence of a combustible or incombustible gas to prepare titanium oxide having a BET specific surface area of from 55 to 150 m²/g and an anatase/rutile crystal structure with a ratio of anatase falling between 0.3 and 0.98, followed by mixing the resulting titanium oxide with from 0.1 to 50% by weight, relative to the titanium oxide, of a silane coupling agent and/or a silicone compound and heating the resulting mixture.

* * * * *